United States Patent [19]

Feldman

[11] 4,271,709

[45] Jun. 9, 1981

[54] GAS DRIVEN GYROSCOPE

[75] Inventor: Abe Feldman, Derby, Conn.

[73] Assignee: Timex Corporation, Waterbury, Conn.

[21] Appl. No.: 67,978

[22] Filed: Aug. 20, 1979

[51] Int. Cl.³ .................. G01C 19/12; G01C 19/26
[52] U.S. Cl. .................................... 74/5.12; 74/5.7
[58] Field of Search ................. 74/5.12, 5.7, 5.43

[56] References Cited

U.S. PATENT DOCUMENTS

| 2,415,899 | 2/1947 | Meyer et al. | 74/5.12 |
| 3,192,777 | 7/1965 | Zatsky et al. | 74/5.12 |
| 3,233,467 | 2/1966 | Brannon | 74/5.7 |
| 3,393,569 | 7/1968 | Lief | 74/5.12 X |
| 4,024,769 | 5/1977 | Hayner | 74/5.7 X |

Primary Examiner—Rodney H. Bonck
Attorney, Agent, or Firm—William C. Crutcher.

[57] ABSTRACT

An improvement in gas driven gyroscopes of the type having a gas driven reaction rotor and integrally contained gas source. A spring loaded valve in the bore of the rotor shaft opens to admit the driving gas to the rotor nozzles and then closes to shut off the gas passages during rundown of the rotor so as to extend the rundown time.

4 Claims, 4 Drawing Figures

GAS DRIVEN GYROSCOPE

BACKGROUND OF THE DISCLOSURE

This invention relates to a gas driven gyroscope with an integrally contained gas source. More particularly it relates to improvements in gas driven gyroscopes which extend the rundown time or maintain higher speeds of the rotor during a specified time.

Gas driven gyroscopes with integrally contained gas sources are known which have a gas driven reaction rotor in one chamber and compressed inert gas in another chamber. Gas is released from one chamber by means such as puncturing a thin wall between the chambers. The gas, when released, flows through the hollow bore of the rotor shaft and outwardly through reaction passages in the rotor to cause it to spin. Changes in the gas pressure may also uncage the gyroscope gimbals after the rotor is spinning.

An example of the foregoing type of gas driven gyroscope is fully detailed in U.S. Pat. No. 3,393,569 issued July 23, 1968 to Lawrence J. Lief and assigned to the present assignee. The Lief patent is incorporated herein by reference and any of the various species of gas driven gyros shown in the Lief patent might employ the improvement of the present invention.

One advantage of a gas driven gyro, as compared to spring driven gyroscopes, is that it has a high ratio of usable energy in relation to its volume and weight. The potential energy in the compressed gas is quickly translated to rotational kinetic energy of the spinning rotor. The "rundown" of the rotor refers to the gradual decrease in rotor speed over time after the gas is expelled through the rotor passages. Various losses affect the rundown. One loss is caused by the reaction rotor acting as a pump rather than as a reaction turbine and acting to suck gas through the end of the shaft and pump it out the rotor exhaust ports thus reducing energy and causng more rapid slowing down of the rotor.

Accordingly, one object of the present invention is to provide an improved gas driven gyroscope with an extended rundown time, or having a higher average speed during a specified rundown time.

Another object of the invention is to provide an improved gas driven gyroscope with reduced losses during rundown.

Another object of the invention is to provide an improved device to shut off gas flow in a gas driven gyroscope with a reaction rotor.

DRAWINGS

The invention, both as to organization and method of practice, together with the objects and advantages thereof, will best be understood by reference to the following description, taken in connection with the accompanying drawings, in which.

SUMMARY OF THE INVENTION

Briefly stated, the invention is practiced by providing, in a gas driven gyroscope of the type having a gas driven reaction rotor in one chamber and compressed gas in another chamber with caging means including a conduit to conduct the compressed gas into the bore of the reaction rotor shaft, the improvement comprising a pressure responsive valve arranged to admit impelling gas to the rotor passages but to block gas flow through the rotor passages when the caging means conduit is disconnected.

DESCRIPTION OF THE PREFERRED EMBODIMENT

Figure 1:
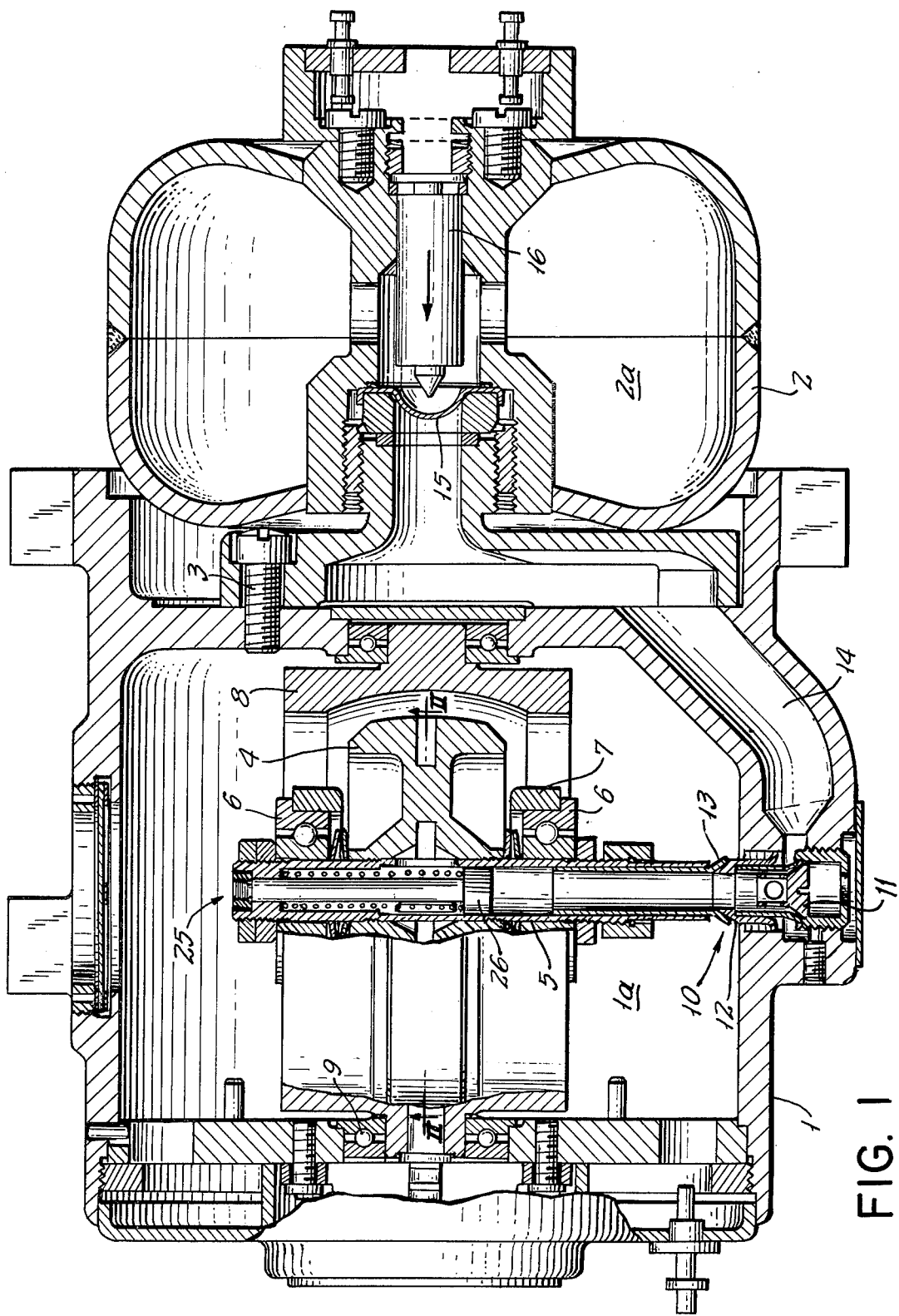
FIG. 1 is a cross-sectional elevation view of a gas driven gyroscope.

Referring to FIG. 1 of drawing, the gyroscope includes a main housing 1 and a compressed gas housing section 2 attached thereto by bolts 3. The main housing defines a chamber 1a enclosing a gas reaction rotor 4 mounted on a hollow shaft 5. The rotor is of high density tungsten alloy and the shaft 5 is mounted in precision high speed bearings 6 supported by the inner gimbal 7. The inner gimbal is rotatably supported in the outer gimbal 8 which, in turn, is supported in bearings 9 in housing 1. The rotor and gimbals are "caged" prior to release of the gas by means of a caging mechanism shown generally at 10. Details of the operation of the caging and uncaging mechanism may be had by reference the aforesaid Lief patent. It should suffice to note that the caging mechanism 10 includes a piston 11 which is initially released and positioned by gas pressure and then caused to hold the caging plug 12 upward against a beveled portion 13 of the rotor shaft. When the gas pressure differential falls to a predetermined value, the caging plug 12 is withdrawn and the rotor and gimbals are uncaged. The caging mechanism also serves as a conduit to conduct compressed gas from an intermediate passage 14 to the interior of hollow rotor shaft 5. However when the caging plug 12 is withdrawn, the conduit is disconnected from one rotor shaft, which now has free access to the interior of housing 1.

The housing section defines a compressed gas chamber 2a which communicates with ports in the caging mechanism via the caging mechanism intermediate connecting passage 14 when a thin disc 15 is punctured in a known manner by an electrically operated pyrotechnic propelled piston 16. The operation of the puncturing mechanism which operates to release compressed inert gas from housing 2 into passage 14 is immaterial to the present invention, but details of several suitable types of mechanisms may be found by reference to the aforesaid Lief patent.

Figure 2:
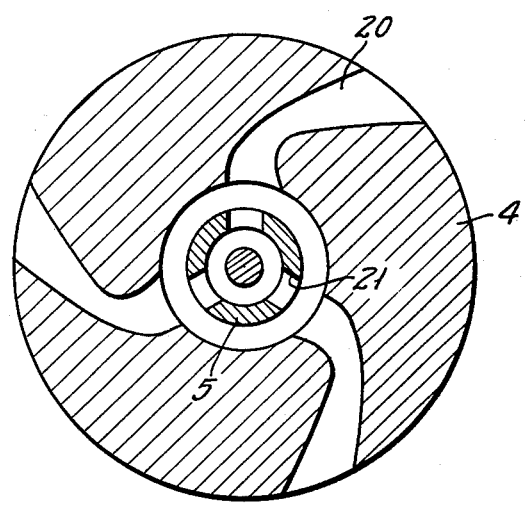
FIG. 2 is a cross-section, taken along lines II—II of FIG. 1 through the rotor and rotor shaft.

Referring to FIG. 2, the cross-section through the gas passages of rotor 4 indicates that it includes a plurality of circumferentially spaced nozzles 20 and that the shaft 5 also includes a plurality of circumferentially spaced gas admission ports 21 freely communicating with nozzles 20.

In operation, an inert gas, preferably nitrogen, at 3000 pounds per square inch is contained in housing 2 and is communicated via passage 14 and caging mechanism 10 to the interior of shaft 5 and thence to rotor nozzles 20 via ports 21. This causes the rotor 4 to spin at a high speed, preferably 36,000–50,000 R.P.M. depending upon the size of the gas chamber and the particular use to which the gyroscope is put. When the gas pressure within the main housing chamber 1a falls to a predetermined value, the caging mechanism 10 releases the rotor and gimbals, also disconnecting the conduit leading to the compressed gas passage 14.

Figure 3:
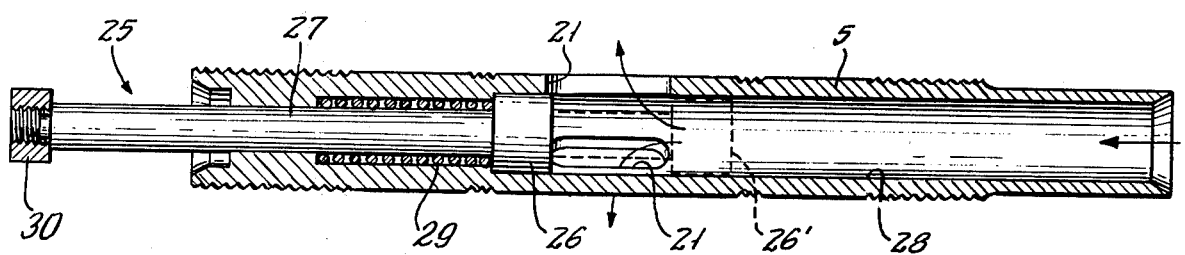
FIG. 3 is an enlarged cross-sectional elevation view of the rotor shutoff valve which is the subject of the present invention.

The foregoing description describes a conventional known structure and is more fully described in the aforesaid Lief patent. In accordance with the present invention, a spring loaded pressure responsive valve device 25 is disposed in rotor shaft 5. The valve device includes a piston 26 which, prior to release of gas, is disposed as indicated in FIG. 1. Reference to the enlarged view of FIG. 3 shows that the valve 25 includes a stem 27 slidably disposed in the bore 28 of the rotor shaft 5.

A spring 29 around the stem normally holds piston 26 in the dotted line position indicated as 26' so that the piston blocks communication between the end of the shaft and the gas ports 21 leading to the rotor nozzles. A threaded nut 30 completes the valve assembly. Release of gas pressure from the compressed gas housing via the caging mechanism into the end of shaft 5 forces the piston 26 to move into the full line position shown in FIG. 3. Diminution of the pressure differential across the piston 26 when the impelling gas is expended allows it to return to the dotted line position 26'. In this position, it blocks the flow of gas through the shaft 5 into the rotor nozzle inlets.

OPERATION

The operation of the invention is as follows. When the gas driven gyroscope is actuated by the ignition mechanism 16 rupturing disc 15 and allowing gas to flow past the caging mechanism into the rotor shaft, piston 26 is displaced to allow the gas to flow through the nozzles and to spin rotor 4. The gyroscope is uncaged in the normal manner. When the pressure falls to a preselected value, piston 26 returns under the action of the spring and blocks the circulation of gas from the interior of shaft 5 into the rotor nozzle inlets. In this manner, the rotor 4 is prevented from pumping quantities of gas during rundown. The wheel can coast without sucking gas or air through the rotor nozzles. This substantially extends the rundown time required to reach a predetermined speed, or alternatively it substantially increases the average speed for a selected rundown time.

Figure 4:
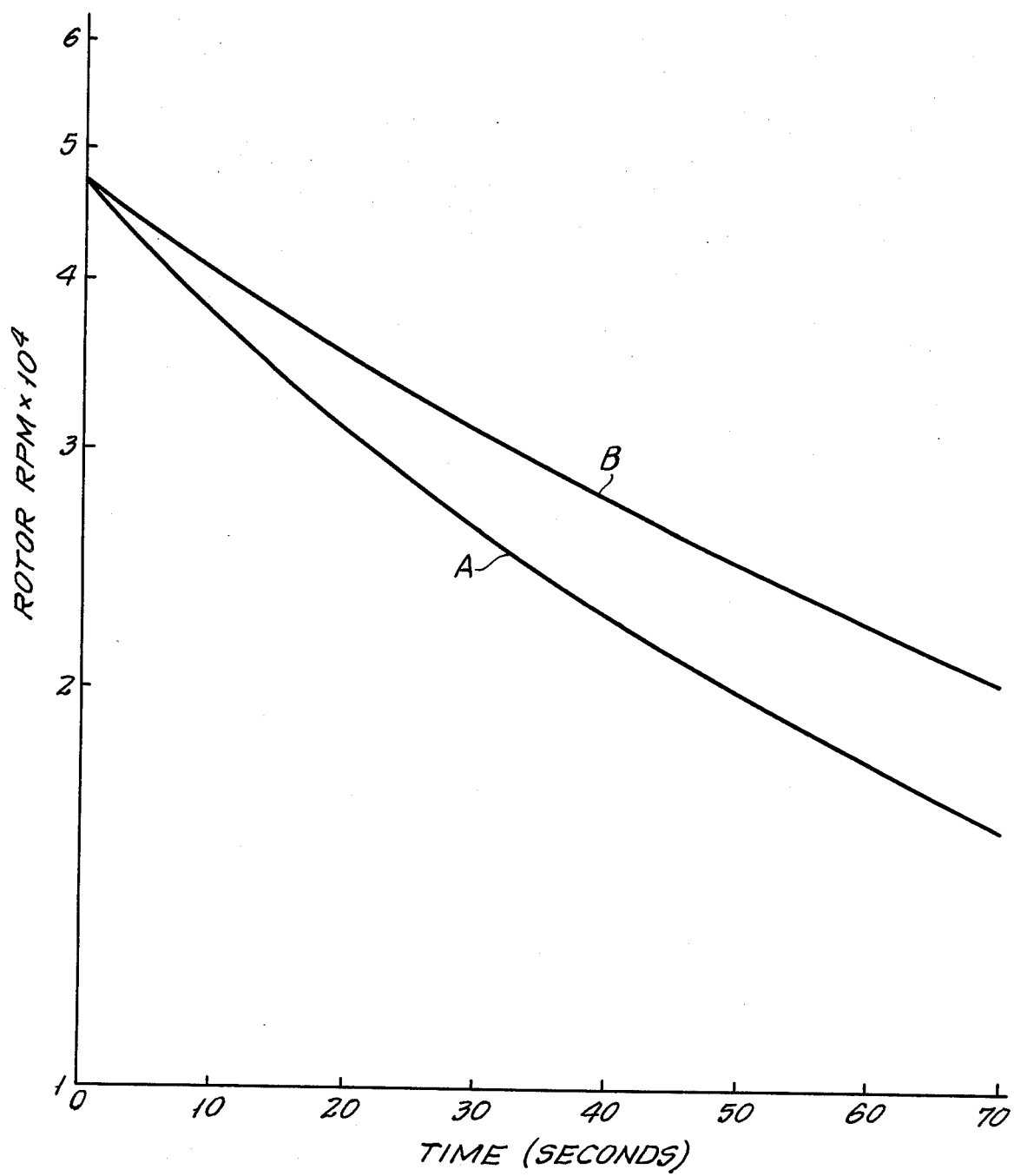
FIG. 4 is a graph illustrating the improved operation of the invention.

Reference to FIG. 4 of the drawing illustrates the improvement realized with a typical application. The graph of FIG. 4 represents time on the horizontal axis versus rotor R.P.M. on the vertical axis. The lower curve "A" shows a decrease of speed over time in a gas driven gyroscope of the type described without the invention and the upper curve "B" shows a rundown characteristic curve with the addition of the applicant's invention in the same gyroscope.

Thus there has been described an improved gas driven gyroscope which substantially improves the rundown characteristic of the gyroscope after release of the impelling gas. This is accomplished by a very simple spring loaded pressure responsive valve mechanism. Other equivalent forms of valves to block the flow of gas to the reaction rotor after the impelling gas has been expended will be apparent and included within the purview of the invention.

While there has been disclosed what is considered herein to be the preferred embodiment of the invention, other modifications will occur to those skilled in the art, and it is desired to include in the appended claims all such modifications as fall within the true spirit and scope of the invention.

I claim:

1. In a gas driven gyroscope of the type having a housing with first and second chambers, said first chamber containing a pressurized gas, said second chamber containing a rotatably mounted rotor on a hollow shaft member, said shaft member having gas admission ports and said rotor having gas reaction nozzles disposed to receive gas from the gas admission ports and spin the rotor, caging means including a conduit for selectively admitting gas from said first chamber into said hollow shaft member, and means disconnecting said caging means conduit from the shaft member after the rotor is spinning, the improvement comprising:
   pressure responsive valve means disposed on the rotor shaft member, and adpated to shut off gas flow from the hollow shaft member into the rotor nozzles after said caging conduit is disconnected.

2. The improvement according to claim 1, wherein said valve means comprises an axially slidable piston disposed in said hollow shaft member.

3. The combination according to claim 1, wherein said pressure responsive valve means comprises an axially slidable piston having a spring biasing said piston to a position to prevent flow of gas from the shaft through said gas admission ports after the pressure across the piston is reduced to a preselected value.

4. A gas driven gyroscope comprising:
   a first housing defining a first chamber containing a pressurized gas,
   second housing defined a second chamber containing a rotor and gimbals rotatably mounting said rotor, said rotor being disposed on a hollow shaft member having gas admission ports, said rotor having gas reaction nozzles disposed to receive gas from the gas admission ports to spin the rotor,
   caging means including a conduit portion connected to admit gas from said first chamber into said hollow shaft member, said caging means also holdng the gimbals,
   means arranged to disconnect said caging conduit portion from the shaft member after the rotor is spinning and to uncage the gimbals,
   pressure responsive valve means comprising an axially slidable piston disposed in the hollow shaft portion and including a spring biasing said piston to a first position blocking gas flow from the shaft portion to said gas admission ports, said piston being responsive to gas pressure to move the piston to a second position unblocking the gas admission ports,
   whereby the pressure responsive valve means slides to admit gas flow to the rotor nozzles when gas is admitted to the hollow shaft member, and whereby said valve means returns to block the flow of gas to the rotor nozzles when the shaft member is disconnected from the conduit portion during uncaging of the rotor gimbals.

* * * * *